United States Patent

Baer et al.

[15] 3,635,752
[45] Jan. 18, 1972

[54] PROCESS FOR THE PREPARATION OF GLASS-CONCENTRATE CAPSULES IN A POLYVINYL CHLORIDE MATRIX

[72] Inventors: Massimo Baer, Longmeadow; Joseph O. Campbell, Agawam, both of Mass.

[73] Assignee: Monsanto Company, St. Louis, Mo.

[22] Filed: Nov. 4, 1969

[21] Appl. No.: 873,805

[52] U.S. Cl. ............117/100 S, 106/308 M, 161/170, 161/176, 252/314, 252/316, 260/41 AG
[51] Int. Cl. ............................B44d 1/02, C08f 1/84
[58] Field of Search............252/316; 117/100 S; 106/308 M; 260/41 AG; 161/170, 176

[56] References Cited

UNITED STATES PATENTS

| | | | |
|---|---|---|---|
| 2,648,609 | 8/1953 | Wurster | 117/100 |
| 3,265,644 | 8/1966 | Herman et al. | 117/100 X |
| 3,272,897 | 9/1966 | Herman et al. | 117/100 X |
| 3,278,329 | 10/1966 | Wiczer | 117/62 |

Primary Examiner—Richard D. Lovering
Attorney—William J. Farrington, Arthur E. Hoffman, Neal E. Willis and Richard W. Sternberg

[57] ABSTRACT

Disclosed herein is a process for the preparation of glass-concentrate capsules which comprise a plurality of strands of glass fibers encapsulated in a collimated array within a vinyl chloride polymer matrix which process comprises:

1. Forming a suspension of strands of glass fibers in a vinyl chloride monomer/water mixture containing a critical amount (viz., from 0.05 to 2.0 percent by weight based on the total weight of monomer and glass) of protective colloid;
2. Agitating the suspension using a low-shear type of agitation which moves the whole suspension pass while avoiding localized high-shear agitation;
3. Polymerizing the monomer; and
4. Recovering the glass-concentrate capsules.

12 Claims, 9 Drawing Figures

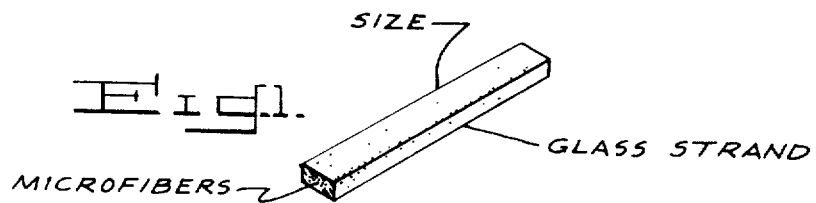
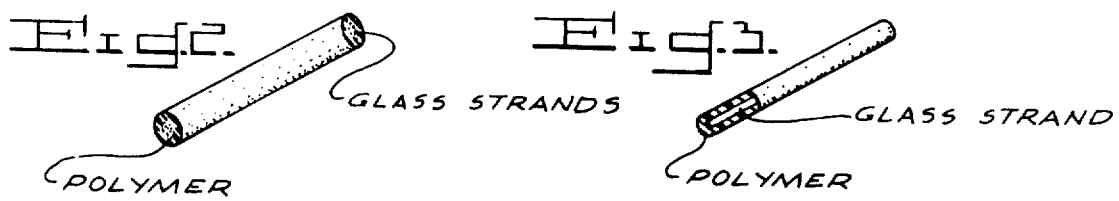
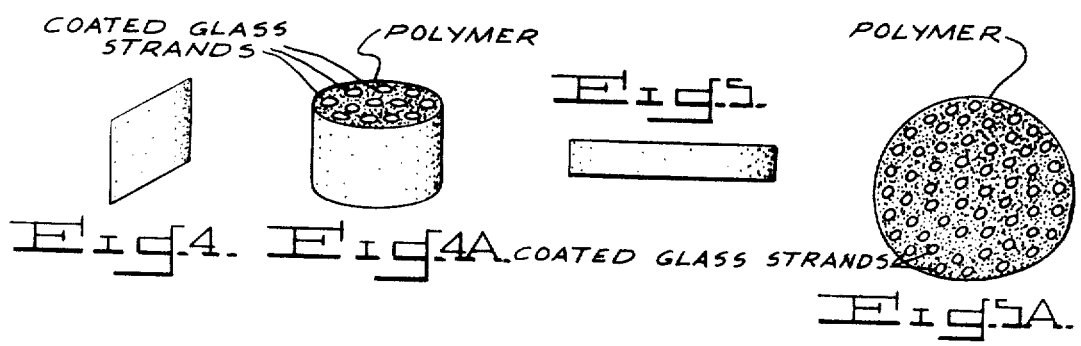
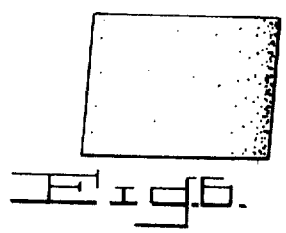
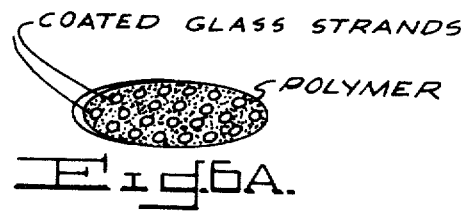
INVENTORS
MASSIMO BAER
JOSEPH O. CAMPBELL
BY William J. Farrington
ATTORNEY

PROCESS FOR THE PREPARATION OF GLASS CONCENTRATE CAPSULES IN A POLYVINYL CHLORIDE MATRIX

BACKGROUND OF THE INVENTION

1. Field of the Invention

The present invention is directed to a method for the preparation of glass-concentrate capsules which comprises a plurality of strands of glass fibers encapsulated in a collimated array within a vinyl chloride polymer matrix.

2. Description of the Prior Art

The use of glass fibers as a reinforcing medium in thermoplastic resin composites is well known in the prior art.

In the preparation of glass fiber reinforced composites it is conventional to use strands of glass fibers which vary in length from 1/32 inch to ¾ inch or longer. These glass strands are conventionally made up of from 200 to 300 microfibers having a diameter in the order of 0.00035 inch which are arranged in a parallel configuration. The surface of the glass strand is conventionally coated with a coupling agent and a film-forming size which keeps the microfibers together and maintains the integrity of the strand. The glass strands are then dry blended with a thermoplastic resin matrix and fed to an extruder or injection molding machine wherein the fibers are distributed throughout the resin matrix and serve as reinforcing elements in the finished composite.

Dry-blending of the glass and resin matrix is considered to be the simplest, most versatile and economical route for large-volume preparation of composites. However, it involves high capital investment for the equipment necessary to avoid the very severe problems of nonuniformity of glass distribution and segregation, debundling, bridging, haystacking and matting of glass during blending, feeding and processing. Consequently, special vibrator proportioning and metering feeds are required.

Debundling is the term to describe that occurrence where the glass strand loses its integrity and the individual microfibers are scattered. Consequently, the loose microfibers would undergo bridging or form haystacking configurations (haystacking) in the hopper which feeds the extruder or injection molding machine. As a result of this haystacking, the desired feed ratio of glass fibers to resin matrix to the molding or extrusion operation would be upset and an inferior product would be produced. Alternatively, the haystack would be fed to the machine in the nature of an embolism and would result in matting of the glass fibers and possible clogging of the machinery causing machine breakdown and/or inferior products.

Attempts to solve the problems of debundling and haystacking led researchers to coat the glass strand with thermoplastic resin polymers. Bradt, in U.S. Pat. No. 2,877,501, teaches coating the outside of an endless glass strand with a polymeric coating followed by heat treatment to fuse the polymer then cutting the strand to the desired lengths. In this method, the cut ends of the glass strands contain exposed ends of microfibers and are possible sites for subsequent debundling. Moreover, there is a polymer gradient which decreases toward the center of the strand. Consequently, the individual microfibers in the core of the strand may not be coated with polymer. Thus, the shearing forces of injection molding or extrusion could cause abrasion of the individual microfibers in the core of the strand with resulting damage to these fibers which detracts from their reinforcing ability.

Malinowski et al. in U.S. Pat. No. 2,688,774, Herman et al. in U.S. Pat. No. 3,265,644; and Wiczer in U.S. Pat. No. 3,278,329 provide a partial solution to the problems mentioned above by coating the glass strand with monomer followed by in situ polymerization to give a single glass strand contained within a thermoplastic resin capsule. In some instances the monomers wet the individual microfibers and upon polymerization provide a coating which helped to protect the microfibers from the adverse effects of abrasion during composite preparation.

However, in the foregoing methods, it is not possible to obtain a high concentration of glass fibers in capsule form which is a desired feature in the preparation of glass-filled composites. Moreover, in many instances the capsules of the prior art, which contain a single glass strand, rather than a plurality of collimated glass strands, have a different density, size and shape than the particles of resin matrix being fed to the extruder or molding apparatus. These differences may result in segregating of the respective particles and a nonuniform product.

Moreover, the glass fibers of the prior art have been mainly used to reinforce polymers such as polystyrene, poly(styrene/acrylonitrile) copolymers, polyesters, etc. Only limited success has been obtained in trying to reinforce poly(vinyl chloride) with glass fibers. This limited success is attributed to the poor wetting of the glass by the vinyl chloride and poor adhesion between the glass and the poly(vinyl chloride) matrix.

A need exists for a process for the preparation of glass concentrate capsules which would provide a high concentration of glass fibers in very compact form which capsules approximate the size and shape of the resin matrix with which they are blended prior to any extruding or molding operations. Moreover, a need exists for glass concentrates in capsule from which would not be susceptible to the problems of debundling, haystacking and matting of glass fibers, etc. which commonly occur when using the glass strands of the prior art. Furthermore, a definite need exists for a more economical way to prepare poly(vinyl chloride) glass composites with improved physical properties.

SUMMARY OF THE INVENTION

THe present invention solves the problems and fulfills the needs mentioned above by providing a process for the preparation of capsules which contain a high concentration of glass strands in a collimated array within a poly(vinyl chloride) matrix. In the capsules which are prepared according to the processes of this invention, the individual microfibers in the strands are also coated with poly(vinyl chloride). These capsules can be prepared in various sizes and shapes by controlling the reaction conditions in order to decrease the problem of segregation. This causes a significant reduction in the need for the elaborate precautions heretofore used in the prior art in order to ensure a uniform and constant feed rate of glass and resin to the processing machinery. Furthermore, the problems of debundling, haystacking and matting of glass fibers which were heretofore commonly associated with the glass strands of the prior art are virtually eliminated. Moreover, the glass concentrate capsules of the present invention can be used to prepare poly(vinyl chloride)—glass composites with improved physical properties such as lower water absorption, higher impact strength, higher tensile strength, higher modulus, improved elongation and heat distortion properties. Furthermore, these improved properties are obtained through a more economical process.

DESCRIPTION OF THE DRAWINGS

FIG. 1 shows a typical glass strand which comprises a bundle of microfibers bound together by a sizing agent.

FIG. 2 shows a typical assembly of glass strands of the prior art which is prepared by coating a vinyl aromatic polymer onto a plurality of endless glass strands and then cutting the resulting coated assembly of strands to the desired length. Note that the ends of the microfibers are exposed providing sites for debundling.

FIG. 3 illustrates encapsulated single strands of the prior art where the glass strand is saturated with monomer which is then polymerized in situ.

FIG. 4 is a plan view of a glass concentrate of the present invention.

FIG. 4A is a front view of the capsule shown in FIG. 4 with the top of the capsule cut away to expose the ends of the glass strands. Note that the glass strands are aligned in a collimated array which allows a very close packing of the strands to provide a high concentration of glass within the capsule.

FIG. 5 is a plan of another type of glass-concentrate capsule prepared according to the present invention.

FIG. 5A is a top view of the capsule shown in FIG. 5. In this view the top has been cut away to expose the ends of the glass strands. Once again note that the glass strands are aligned in a collimated array which allows a very close packing of the strands to provide a high concentration of glass within the capsule.

FIG. 6 is a plan view of another type of glass-concentrate capsule which is prepared according to the processes of the present invention. This particular configuration is in the form of a flat tape as opposed to the rounded capsules illustrated in FIGS. 4A and 5A.

FIG. 6A is a top view of the capsule shown in FIG. 6. Once again note that the glass strands are aligned in a collimated array which allows a very close packing of the strands to provide a high concentration of glass within the capsule.

DESCRIPTION OF THE PREFERRED EMBODIMENTS

The glass-concentrate capsules of the present invention are prepared by encapsulating the glass strands in a resin matrix by in situ polymerization of the monomers using a critical amount of protective colloid and a critical type of agitation.

In the practice of the present invention from 20 to 90 parts by weight of vinyl chloride monomer are polymerized in the presence of from 10 to 80 parts by weight of glass strands, based on 100 parts by weight of glass and monomer. The polymerization is carried out in aqueous suspension using a critical amount of a protective colloid.

The amount of water used will vary of from 100 to 1,600 parts by weight, based on 100 parts by weight total of the glass and monomer. The amount of protective colloid used is critical and must be determined for each system. In general, the amount of the protective colloid used will fall in the range of from 0.05 to 2.0 parts by weight based on 100 parts by weight total of glass and monomer.

The monomer is then polymerized by heating the contents of the vessel to a temperature in the range of from 0° to 110° C. During this time low-shear agitation is maintained in order to keep the whole mass moving while avoiding localized high-shear agitation.

During the polymerization step the glass strands become impregnated and coated with monomer, aligned and subsequently encapsulated by the resulting resin matrix. The glass fibers in the capsules are normally aligned in a substantially collimated array to form cylinders or flat tapes in which the glass strands are butted end to end. The length of the capsules is generally slightly greater than the length of the original chopped strands. The microfibers which form the glass strands are also surrounded by and imbedded in the polymer matrix.

The glass component used in the present invention are strands of glass fibers which vary in length from 1/32-inch to ¾-inch or longer. Preferably, the glass strands are about ⅛-inch to ¼-inch long and about 1/16 to 3/16-inch wide. The glass strands are preferably sized with material which will become swollen in the monomers used to form the resin matrix without dissolving in the matrix. Moreover, the monomers and the polymers formed therefrom should be compatible with the size used in order to ensure that the polymers will have sufficient adhesion to the glass strands.

The monomer used in the present invention is vinyl chloride. Optionally, small amounts of a comonomer are used. The preferred comonomers are ethylene, propylene, vinyl chloride, maleate and fumarate esters and monomers of the general formula:

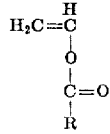

wherein $R_1$ is selected from the group comprising hydrogen, alkyl groups of from one to 10 carbon atoms, aryl groups of from six to 10 carbon atoms including the carbon atoms in ring-substituted alkyl substituents; e.g., vinyl formate, vinyl acetate, vinyl propionate, vinyl benzoate, and the like.

In addition, the present invention also contemplates the use of a saturated rubber component in combination with the foregoing monomers. This rubbery component would include polyisoprene, polyisobutylene, chlorinated polyethylene, ethylene vinyl acetate copolymers, propylene oxide rubbers, etc. These would include polyblends, graft copolymers and physical admixtures of a rubbery component with the monomers used to encapsulate the glass. Rubbery compositions are well known to those skilled in the polymer art and need no further explanation here. Also, the glass strands used in the practice of the present invention can first be impregnated with a rubber and then encapsulated.

The glass strands may be first wet with either monomer or water. When the strands are first wet with water the monomer will subsequently displace the water and impregnate the glass strands and encapsulate the individual microfibers as well as the strands themselves. Thus, following polymerization, the individual microfibers as well as the aligned strands are fully surrounded and protected by the resin matrix. Moreover, by controlling the polymerization conditions the glass-concentrate capsules can be prepared in a variety of sizes and shapes.

The role of the protective colloid in this invention is very important and certain critical requirements must be met. The choice of protective colloid and the amount used depends on factors such as the length of glass strands, the monomers used for encapsulation, the ratio of glass to monomers and the ratio of water to monomers. The optimum amount of protective colloid is dictated by the size, shape and uniformity desired in the resulting glass-concentrate capsule.

In general, when excessive protective colloid is used there is no aligning of the glass strands into a collimated array and only a thin coating of polymer is found on the individual strands. Most of the polymer will be present as fine suspension beads or powders. When insufficient protective colloid is used there is no aligning of glass strands into a collimated array. Moreover, the polymer forms into oversized beads or else complete coagulation occurs. When using an optimum amount of protective colloid, the glass strands are individually coated with polymer and are aligned and butted end-to-end in a substantially collimated array to form capsules which pass through a number 2.5 U.S. standard screen and are retained on number 40 screen. Moreover, when using optimum amounts of protective colloid there are little or no polymer fines which indicate that substantially all of the monomer is polymerized around the glass strands.

Examples of protective colloids for use in the present invention include those synthetic and naturally occurring material which are well known to those skilled in the art. These include polyvinyl alcohol, partially hydrolyzed polyvinyl acetate, soluble starch, soluble starch derivatives, dextrin, gum tragacanth, gum arabic, gum acacia, gum tragon, gelatin, agar-agar, methyl cellulose, methylhydroxypropyl cellulose, ethylhydroxyethyl cellulose, sodium carboxymethyl cellulose, water-soluble glycol cellulose, bentonite, sodium alginate, sodium silicate, tricalcium phosphate, salts of polycarboxylic acids such as the sodium salts of polyacrylic acid, partial esters of polymethacrylic acid, copolymers of acrylic acid and 2-ethyl hexyl acrylate copolymers of vinyl acetate and maleic anhydride and the like.

Especially preferred protective colloids include polyvinyl alcohol, partially hydrolyzed polyvinyl acetate, bentonite, partial esters of polymethacrylic acid and copolymers of acrylic acid and 2-ethyl hexyl acrylate which are described in U.S. Pat. No. 2,945,013 and copolymers of vinyl acetate-maleic anhydride.

The amount of protective colloid used is very critical and must be determined for each individual system. The amount of protective colloid used will vary with the nature of the colloid as well as with the amount of glass, monomer and water used in the polymerization step. The length of the glass strands and the type of monomers are other factors which determine the amount of protective colloid used. In this regard it should be noted that larger concentrations of suspending agents are required with longer glass strands and with decreasing monomer/glass ratio.

As a general rule, the amount of protective colloid used will be in the range of from 0.05 to 2.0 percent by weight based on the total weight of monomer and glass. Within this range the optimum amount for a given system must be determined by the nature of the other components in the system as well as by the amounts of these components. Those skilled in the art will be readily able to determine the optimum amount of protective colloid required for any given system from the teachings set forth in the working examples.

The amount of water used in the polymerization process will vary depending on the weight of the glass and monomers. In general, the amount of water will vary from 100 to 1,600 parts by weight, based on 100 parts by weight of the glass and monomer. In the especially preferred process, where the monomer is present in amounts of from 40 to 80 parts by weight based on a total of 100 parts by weight of glass and monomer, the amount of water used will vary from 100 to 600 parts by weight based on a total of 100 parts by weight of glass and monomer.

The type of agitation used during the polymerization of the monomers is also very critical. Collimation and encapsulation of the fibers is only successfully achieved when using low-shear agitation of the type that causes the whole mass to move without causing localized high-shear agitation. Attempts to encapsulate glass fibers in an agitated Pfaudler-type reactor generally results in considerable debundling of the glass strands into the fibers which tended to form matted balls which interferes with the collimation. Suitable agitation may be achieved by tumbling the reactor end-to-end, or in those types of horizontal-type reactors where the entire mass is moved in a cascading-type motion.

In the preferred polymerization process of this invention, conventional polymerization initiators and chain transfer agents are used. However, it should be noted that the use of these materials are optional and that the polymerization step may be carried out using heat along without any polymerization initiator.

The polymerization step is carried out at temperatures of from 0° to 110° C. under pressure. The preferred polymerization temperature is in the range of from 40° TO 90° C. The polymerization step is carried out until a substantial amount of monomer is converted to polymer. The time required will depend on the particular system and polymerization conditions used as well as on the degree of conversion desired.

The glass-concentrate capsules of the present invention comprise from 10 to 80 percent by weight of glass. More preferably, the capsules comprise from 20 to 70 percent by weight of glass. Conversely, the capsules comprise from 20 to 90 percent by weight of thermoplastic resin matrix. More preferably, the capsules comprise from 30 to 80 percent by weight of resin.

The preferred glass-concentrate capsules of the present invention are those which pass through a number 2.5 U.S. standard screen and which are retained on a number 40 U.S. standard screen. The more-preferred glass-concentrate capsules are those that pass through a number 4 screen and which are retained on a number 20 screen.

The glass-concentrate capsules weigh about 10 to 350 times more than the average weight of one of the original glass strands used as the starting material. The preferred glass-concentrate capsules weigh about 20 to 150 times more than the average weight of one of the original glass strands.

Preferably, at least five to 10 glass strands are encapsulated in the glass-concentrate capsules of the present invention. As stated above, these are encapsulated in a substantially collimated array within a thermoplastic matrix. The substantially collimated array allows close packing of the glass strands which, in turn, provides a capsule with a high concentration of glass.

The final size, shape and composition of the glass-concentrate capsules will depend on the particular system and polymerization conditions used. These will be dictated by the particular end use requirements desired. In general, the capsules are prepared so that they can be blended with a diluent thermoplastic matrix in the form of powder, beads or extruded chips, without encountering problems of segregation or nonuniformity.

The following examples are set forth in illustration of this invention and should not be construed as a limitation thereof. Unless otherwise indicated, all parts and percentages given are by weight.

EXAMPLE 1

This example illustrates the preparation of glass-concentrate capsules which contain about 30 percent by weight of glass strands arranged in a collimated array within a vinyl chloride polymer matrix. The following charge is used in this example:

| Ingredients | Parts by weight |
|---|---|
| chopped-glass strands ⅛-inch long | 15 |
| vinyl chloride | 40 |
| water | 80 |
| methyl cellulose | 0.18 |
| lauroyl peroxide | 0.12 |

The chopped glass strands (Johns-Manville CS–308) are charged to a reactor and the entrapped air is removed by purging with nitrogen. The vinyl chloride monomer is then charged to the reactor under a nitrogen purge. The reactor is then sealed and rotated to completely wet the glass with monomer. After the glass is completely wet by the monomer, nitrogen-purged, distilled water is charged along with the methyl cellulose. The methyl cellulose used as the protective colloid is a hydroxypropylmethyl cellulose ether, which is available as Methocel 90 HG. This material which has a viscosity of about 4,000 c.p.s. is prepared by etherification of from 85 to 90 percent of the available cellulose hydroxyl groups with methyl and hydroxy propyl groups. The reactor is then sealed and rotated end-over-end in a thermostatically controlled water bath at 54° C. for 16 hours. The resulting capsules are then discharged onto a screen and washed with cold and hot water. There is only slight evidence of polymer agglomeration and there are only a few fine polymer particles indicating that most of the monomer has polymerized around the glass fibers.

The resulting glass concentrate capsules which contain about 30 percent by weight of glass, pass through a 2.5 U.S. standard screen and are retained on a 40 screen. These capsules weigh 10 to 30 times more than the average weight of the ⅛-inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

EXAMPLE 2

Example 1 is repeated here except that the amount of methyl cellulose is reduced to 0.12 part. The resulting glass-concentrate capsules are comparable to those obtained in example 1.

EXAMPLE 3

Example 2 is repeated here except that the amount of methyl cellulose is increased to 0.24 part. The resulting glass-concentrate capsules are comparable to those obtained in example 2.

EXAMPLE 4

This example illustrates that collimation of the glass strands does not occur when the amount of the methyl cellulose protective colloid used in examples 1 to 3 falls below a certain critical level.

Example 1 is repeated here except that the amount of protective colloid is reduced to 0.04 part. During the course of the polymerization reaction agglomeration of monomer-polymer occurs and no glass-concentrate capsules are obtained.

EXAMPLE 5

This example illustrates that collimation of the glass strands does not occur when the amount of the polymeric protective colloid used in example 1 to 3 is above a certain critical level.

Example 1 is repeated here except that the amount of protective colloid is increased to 0.45 part. After a 16-hour polymerization time, the contents of the bottle are discharged onto a screen. An examination of the solids shows fine polymer particles totally devoid of glass together with lightly coated glass strands. There is substantially no collimation of glass strands into capsules.

EXAMPLE 6

This example illustrates the prewetting of the glass with water followed by charging of the monomer to the reaction vessel.

Example 1 is repeated here except that the glass strands are first wet with water followed by charging of the monomers. The resulting glass-concentrate capsules are comparable to those obtained in example 1, except that the glass content is about 27 percent by weight.

EXAMPLE 7

Example 6 is repeated here except that 0.10 part of methyl cellulose is used. The resulting glass-concentrate capsules are comparable to those obtained in example 6.

EXAMPLE 8

Example 6 is repeated here except that 0.28 part of methyl cellulose is used. The resulting glass-concentrate capsules are comparable to those obtained in example 6.

EXAMPLE 9

This example is set forth to illustrate the preparation of glass-concentrate capsules containing about 43 percent by weight of glass. The following charge is used:

| Ingredients | Parts by weight |
| --- | --- |
| chopped-glass strands ¼-inch long | 25 |
| vinyl chloride | 40 |
| water | 120 |
| methyl cellulose | 0.30 |
| lauroyl peroxide | 0.12 |

The general polymerization procedure of example 1 is repeated here except that the vinyl chloride monomer is charged after the glass has been wet with the water. The resulting capsules are then discharged onto a screen and washed with cold and hot water. There is only slight evidence of polymer agglomeration and there are only a few fine polymer particles indicating that most of the monomer has polymerized around the glass fibers.

The resulting glass concentrate capsules which contain about 43 percent by weight of glass, pass through a 4.0 U.S. standard screen and are retained on a 20 screen. These capsules weigh 10 to 30 times more than the average weight of the ¼-inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

Examples 10 to 14, which are tabulated in the following table 1, are set forth to illustrate some of the variations in the reactor charge which are possible within the scope of this invention. In each example the general polymerization methods of example 1 are used and 0.3 percent by weight, based on the weight of the monomer, of lauroyl peroxide, is used as the polymerization initiator. The encapsulated glass products obtained in each example are comparable to those obtained in example 1.

TABLE 1.—(SUMMARY OF EXAMPLES 10 TO 14) CHARGE TO REACTOR

| Ingredients (parts by weight) | Example | | | | |
| --- | --- | --- | --- | --- | --- |
| | 10 | 11 | 12 | 13 | 14 |
| Glass | 15 | 15 | 15 | 15 | 25 |
| Vinyl chloride | 40 | 40 | 40 | 32 | 38 |
| Vinyl acetate | | | | 8 | 2 |
| Water | 80 | 80 | 80 | 80 | 120 |
| Colloid A | 0.2 | | | | |
| Colloid B | | 0.15 | | | |
| Colloid C | | | 0.2 | | |
| Colloid D | | | | 0.18 | 0.30 |

NOTE.—Colloid A = a copolymer of vinyl acetate and maleic anhydride (1/1 mole ratio); Colloid B = polyvinyl alcohol having a residual vinyl acetate content of 30% by weight and a 4% aqueous solution viscosity at 20° C. of 21 cps.; Colloid C = a copolymer of vinyl methyl ether and maleic anhydride (1/1 mole ratio); Colloid D = the methyl cellulose used in Example A.

EXAMPLE 15

This example illustrates the preparation of glass-concentrate capsules which contain about 30 percent by weight of ¼-inch glass strands arranged in a collimated array within a poly(vinyl chloride) matrix. The following charge is used in this example:

| Ingredients | Parts by weight |
| --- | --- |
| chopped-glass strands ¼-inch long | 15 |
| vinyl chloride | 40 |
| water | 150 |
| protective colloid | 0.25 |
| lauroyl peroxide | 0.12 |

The protective colloid and the general procedures of example 1 are used in this example.

The resulting glass concentrate capsules which contain about 32 percent by weight of glass, pass through a 2.5 U.S. standard screen and are retained on a 40 screen. These capsules weigh 10 to 35 times more than the average weight of the ¼-inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

The following examples 16 to 24 illustrate the critical requirement of using low-shear agitation wherein the whole suspension polymerization mass moves while avoiding localized higheshear agitation. The apparatus used in these examples is conventional for suspension polymerization and is well known to those skilled in the art. Here the polymerization reaction is carried out in an autoclave equipped with a 5/16-inch steel thermowell baffle, an agitator and a nitrogen inlet. Both anchor- and Pfaudler-type agitator blades are used in these examples. Except for the differences in the reactors, the general polymerization procedures used above are followed here.

EXAMPLES 16 to 18

In these examples the methyl cellulose used in example 1 is used as the protective colloid. The agitator used is a flat-faced anchor agitator having a diameter of 3½ inches and a ½-inch face. Those skilled in the art will readily recognize this agitator as being of a type conventionally used in polymerization reactions. The agitator is run at 200 r.p.m. which is determined to be optimum in order to prevent debundling of the glass strands. However, at this speed there is insufficient turbulence and the glass could not adequately be dispersed. Consequently, there is no encapsulation and collimation of the glass. A summary of the charges used in these examples is set forth in table 11.

TABLE II

Summary of Examples 16 to 18

| Ingredients (Parts by weight) | 16 | Example 17 | 18 |
|---|---|---|---|
| glass strands ¼-inch long | 15 | 15 | 15 |
| vinyl chloride | 40 | 40 | 40 |
| water | 80 | 120 | 200 |
| methyl cellulose | 0.18 | 0.20 | 0.24 |
| lauroyl peroxide | 0.12 | 0.12 | 0.12 |

The foregoing examples 16 to 18 are repeated except that a 3¼-inch diameter anchor agitator having curved 1-inch wide blades with a slight twist reaching to the top of the liquid is used. Once again an agitator speed of 200 r.p.m. was determined to be optimum to prevent debundling of the glass strands. No improvement in dispersing the monomer/glass slurry is observed and there is no encapsulation and collimation of the glass.

EXAMPLES 19 to 21 the foregoing examples 16 to 18 are again repeated except using a Pfaudler-type agitator which is 3½ inches in diameter. The agitator used has three flat faced blades ⅝-inch high. When run at 500 to 600 r.p.m. this agitator gives excessive agitation which causes shearing and debundling of the glass strands. The result are large quantities of matted glass in the reaction and no collimation takes place. When the agitator is run at speeds which do not cause shearing and debundling of the glass strands, there is insufficient dispersion of the glass and no encapsulation and collimation takes place.

EXAMPLES 22 to 24

In these examples the general procedures of examples 16 to 18 are repeated except that a Pfaudler-type agitator which is 3 inches in diameter is used. The agitator is a three-fingered retreating blade type with blades ⅜-inch wide. The slurry is adequately dispersed without excessive shearing of the glass strands by placing the retreating blades close to the bottom of the reactor, and running the agitator in the range of from 220–550 r.p.m. Examination of the resulting product from each example indicates that there is some coating of some of the individual glass strands. However, no collimation is observed to take place. There is also substantial amounts of matted glass balls and finely dispersed polymer.

The use of conventional suspension polymerization equipment and procedures causes shearing and debundling of the glass fibers. The resulting matted glass balls are especially undesirable as they cause disruption of the system. Moreover, collimation of the glass strands does not occur when using conventional suspension-type polymerization. Successful collimation is only found to occur with low-shear agitation of the type which causes the whole suspension polymerization mass to move while avoiding localized high-shear agitation. Examples of suitable-type agitation include the cascading type of agitation that occurs when the reactor is tumbled end-over-end as in example 1 and that which occurs in liquid-solid blenders, conical blenders and horizontal-type reactors. These reactors are well known to those skilled in the art and need no further description here.

The glass-concentrate capsules of the present invention are blended with a thermoplastic resin matrix and then processed into useful composites. The use of the glass-concentrate capsules of the present invention provides a more convenient and more economical process for preparing composites than other methods previously used in the prior art. Moreover, the physical properties of the composites prepared from the glass-concentrate capsules of the present invention are superior in many respects to the properties of those composites prepared according to the procedures of the prior art. The improved properties which are obtained in the final composite include lower water absorption, higher tensile and impact strength, higher modulus and better elongation.

The following examples are set forth in order to illustrate the improved properties of composites which are prepared from the glass-concentrate capsules of the present invention.

In these examples the composites are prepared by mixing the glass concentrate capsules, or the glass strands in case of the control examples, with a thermoplastic resin matrix. The proportions of ingredients in each example are adjusted so as to provide composites containing approximately 20 percent by weight of glass. The blended ingredients are extruded on a 1-inch extruder using a single-flight vinyl screw having a length to diameter (L/D0 ratio of 18. the extrusions are carried out at temperatures of 400° F. while cooling the hopper with water. THe extrudiate is air coiled on a long takeoff table and chopped into ¼-inch to ½-inch chips in a standard double-blade cutter. All of the test specimens are prepared using 1 percent by weight of Acrawax C lubricant and 1.25 percent by weight of a tin stabilizer. The POLY(vinyl chloride) used in each example is a homopolymer having a weight average molecular weight in the range of from 50,000 to 58,000.

Test specimens are injection molded at 370° F. and 700 to 1,000 p.s.i. using an oversized orifice in the nozzle. The test specimens are then subjected to the following tests:

tensile PROPERTIES

TEst specimens (4 inches ×¼ inch ×1/10 inch) are prepared by injection molding at 370° F. and 1,000 p.s.i. Tensile moduli, fail strength and elongation are determined on a floor-mcdel instron using an extensometer.

IZOD IMPACT

Test specimens (2 ½ inches ×½ inch ×⅛ inch) are molded under similar conditions to the tensile specimens except that 700 p.s.i. pressure is used. The specimens are notched with a k 0.1 inch notch radius and impact strength is determined using a 2-lb. hammer.

HEAT DISTORTION

Heat distortion is determined on injection molded 2 ½ inches ×½ inch ×⅛ inch samples at 264 p.s.i., with a 2 inches span.

EXAMPLE 23 (CONTROL)

This example is set forth as a control to illustrate the properties of poly(vinyl chloride) test specimens which contain no glass-reinforcing AGENT. The test specimens are prepared according to the above procedures. Test results are tabulated in table III below.

EXAMPLE 24 (CONTROL)

Example 23 is repeated here except that 20 percent by weight of the poly(vinyl chloride) is replaced by a styrene/acrylonitrile copolymer which contains 74 weight percent styrene and 20 weight percent acrylonitrile. This example is included as a control to illustrate that the presence of poly(styrene-acrylonitrile) upgrades the physical properties of the poly(vinyl chloride).

EXAMPLE 25

This example is set forth to illustrate the properties of a composite which is prepared according to the teachings of the prior art. In this example plain glass strands of the type illustrated in FIG. 1 are dry blended with poly(vinyl chloride) homopolymer. Special precautions were taken to ensure proportionate feeding to the extruder in order to avoid the severe problems of glass segregation, nonuniformity of glass distribution, glass debundling during transfer and blending and briding of glass in the feed hoppers. Composites are formed and tested according to the above procedures. The test results are tabulated in the table III below

EXAMPLE 26

Example 25 is repeated here except that about 20 percent of the poly(vinyl chloride) is replaced by the styrene/acrylonitrile copolymer used in example 24. This example is set forth in order to further illustrate the superior physical properties that are obtained in composites prepared using the glass-concentrate capsules of the present invention.

EXAMPLE 27

In this example the glass concentrate capsules prepared in example 1 above are blended with the poly(vinyl chloride) homopolymer. Composites are formed and tested according to the above procedures. The test results are tabulated in the table III below.

EXAMPLE 28

Example 27 is repeated here except using the glass-concentrate capsules prepared in example 9. Composites are formed and tested according to the above procedures. The test results are tabulated in the table III below.

styrene/acrylonitrile copolymer is blended with the poly(vinyl chloride) there is a slight increase in tensile, modulus and heat distortion which is accompanied by a decrease in percent elongation and izod impact. However, the physical properties of this polyblend are still inferior to the glass-reinforced polymers.

Examples 25 and 26 are prepared by the conventional prior art method of dry blending glass strands and the resin matrix. These glass-reinforced examples have superior physical properties to the unreinforced samples in examples 23 and 24 except for percent elongation. Note once again that substitution of a styrene/acrylonitrile copolymer for part of the poly(vinyl chloride) gives rise to a difference in some of the physical properties. In this regard note that example 26 has slightly better tensile and heat distortion than the corresponding example 25 which does not contain a styrene-acrylonitrile copolymer. However, the properties of these samples are still inferior to those samples prepared from the glass-concentrate capsules of the present invention.

Examples 27 and 28, which are prepared using the glass-concentrate capsules of the present invention, are definitely superior in tensile, modulus, heat distortion and izod impact to those samples which do not contain any glass reinforcing element (examples 23 and 24). Examples 27 and 28 are also superior to examples 25 and 26, the glass-reinforced composites prepared by the dry blending procedure of the prior art, in regard to tensile, percent elongation, modulus and izod impact.

The superior tensile, modulus and izod impact results which are obtained using the glass-concentrate capsules of the present invention (examples 27 and 28) are surprising in view of the fact that prior attempts to reinforce poly(vinyl chloride) with glass have been met with considerable difficulty. Consequently, it was believed that the physical properties of poly(vinyl chloride) could not be upgraded to the same extent by glass fibers as the styrene homopolymers and copolymers. Poly(vinyl chloride) presented a problem in that the adhesion between the poly(vinyl chloride) and the glass was less than desirable. Furthermore, it was believed that the processing conditions required for poly(vinyl chloride)/glass composites caused abrasion and subsequent degradation of the glass fibers. Consequently, the glass fibers lost much of their reinforceability during the processing step.

The glass-concentrate capsules of the present invention go a long way to solving the foregoing problems. In the present invention there is better wetting of the glass by the monomer. This leads to better adhesion of the poly(vinyl chloride) matrix to the glass and subsequent encapsulation of the individual fibers within the glass strands which are all encapsu- TABLE III.—(SUMMARY OF EXAMPLES 23 TO 28) PROPERTIES OF COMPOSITES CONTAINING 20% GLASS

| Example [1] | Tensile, p.s.i.× $10^{-3}$ | Percent elongation | Modulus, p.s.i.× $10^{-5}$ | Heat dist., T., °C., 264 p.s.i. | Izod impact, ft. lbs./in. |
|---|---|---|---|---|---|
| 23 (Control) | 7.8 | 3.5 | 4.1 | 71 | 0.7 |
| 24 (Control) | 8.0 | 3.1 | 4.4 | 72.5 | 0.56 |
| 25 | 10.1 | 1.4 | 10.8 | 78.5 | 1.2 |
| 26 | 10.6 | 1.3 | 10.4 | 80 | 1.2 |
| 27 | 14.1 | 1.6 | 11.9 | 79.5 | 2.8 |
| 28 | 14.0 | 1.7 | 11.8 | 80 | 2.8 |

[1] The compositer in Examples 23 and 24 are control samples which contain no glass. The composites in Examples 25 and 26 are prepared by the prior art method of dry blending glass strands and the thermoplastic polymer matrix. The composites in Examples 27 and 28 are prepared using the glass concentrate capsules of the present invention.

The data in the foregoing table III clearly illustrate that composites prepared from the glass-concentrate capsules of the present invention (examples 27 and 28) have generally superior physical properties than the control samples (examples 23 and 24) or those composites prepared according to the teaching of the prior art (examples 25 and 26).

Except for percent elongation, the unreinforced polymers of examples 23 and 24 have poorer physical properties than those reinforced samples. In example 24, when a lated with poly(vinyl chloride) and arranged in a collimated array.

In addition to the foregoing tests, water absorption test are run on composite tensile samples by soaking the composite in water at 65° C. for 24 hours. After this time the sample is examined visually, the amount of water pickup is measured, and a tensile test is run on the wet sample. The test samples from examples 27 and 28, which are prepared using the glass-concentrate capsules of the present invention, show less opaqueness, less water pickup and higher wet tensile strength than do the test samples from the other examples.

It would appear that the poorer water absorption test results that were obtained in examples 25 and 26 are due to water wicking in along the glass fibers in the composite causing separation of the matrix from the glass with resulting numerous microcracks which causes opaqueness in the composite. Consequently, these composites absorb more water, exhibit more opaqueness and exhibit a greater decrease in tensile strength than those composites which are prepared from the glass-concentrate capsules of the present invention. In the glass-concentrate capsules of the present invention the individual strands and the microfibers making up the strands are encapsulated by the polymeric matrix. Thus, there is less wicking of water by the glass fibers, less water absorption, less opaqueness and greater retention of tensile strength. Moreover, it is observed, after burning off the resin matrix, that the glass fibers from the glass-concentrate capsules of the present invention show far less fiber abrasion or damage due to mechanical processing in the extruding and molding operation. On the other hand, there is much greater fiber abrasion and damage in those composites which are prepared in examples 25 and 26. Presumably, the polymeric coating around the individual microfibers and glass strands in the glass concentrate capsules of the present invention protects the fibers from damage and abrasion during mechanical processing of these materials. Consequently, the fibers are better able to reinforce the resulting composite thus giving it greater strength.

The foregoing theory in regard to the better properties of composites made from the glass-concentrate capsules of the present invention is set forth to explain the observed effects and is not intended that the scope of the invention should, in any way, be limited by this theory.

The composites which are prepared from the glass concentrate capsules of the present invention are especially useful in the fabrication of molded and extruded parts for automobiles such as dashboards, moldings, trim, etc. refrigerators, radio and television cabinets. Other uses for these composites are found in household appliances, industrial applications and in general wherever high performance thermoplastic resin parts are required.

It will be obvious to those skilled in the art that many modifications may be made in the products and processes set forth above without departing from the scope of this invention.

What is claimed is:

1. A process for the preparation of glass-concentrate capsules which comprise a plurality of strands of glass fibers encapsulated in a collimated array within a vinyl chloride polymer matrix which process comprises:
   A. Forming a suspension of strands of glass fibers in a vinyl chloride monomer/water mixture containing from 0.05 to 2.0 percent by weight of protective colloid based on the total weight of monomer and glass;
   B. Agitating the suspension using a low-shear type of agitation which moves the whole suspension mass while avoiding localized high-shear agitation;
   C. Polymerizing the monomer; and
   D. Recovering the glass-concentrate capsules.

2. A process as in claim 1 wherein the glass strands are from ⅛ to ¼-inch long.

3. A process as in claim 1 wherein the monomer is a mixture of vinyl chloride and vinyl acetate.

4. A process as in claim 1 wherein the suspension is agitated by tumbling end-over-end.

5. A process for the preparation of glass-concentrate capsules, which comprises a plurality of strands of glass fibers encapsulated in a collimated array within a vinyl chloride polymer matrix, which process comprises:
   A. Forming a suspension of strands of glass fibers having a length of from 1/32 to ¾ inch in a vinyl chloride monomer/water mixture containing from 0.05 to 2.0 percent by weight, based on the total weight of monomer and glass, of a protective colloid selected from the group consisting of interpolymers of acrylic acid and 2-ethylhexyl acrylate, methyl cellulose and polyvinyl alcohol;
   B. agitating the suspension using a low-shear type of agitation which moves the whole suspension mass while avoiding localized high-shear agitation;
   C. polymerizing the monomer; and
   D. recovering the resulting concentrate capsules.

6. A process as in claim 5 wherein the glass strands have a length of from ⅛ to ¼ inch.

7. A process as in claim 5 wherein the monomer is a mixture of vinyl chloride and vinyl acetate.

8. A process as in claim 5 wherein the protective colloid is methyl cellulose.

9. A process as in claim 5 wherein the protective colloid is polyvinyl alcohol.

10. A process for the preparation of glass-concentrate capsules, which comprises a plurality of strands of glass fibers encapsulated in a collimated array within a poly(vinyl chloride) matrix, which process comprises:
    A. Suspending from 10 to 80 parts by weight of strands of glass fibers having a length of from 1/32 to ¾ inch in a mixture comprising from 20 to 90 parts by weight of vinyl chloride and from 100 to 1,600 parts by weight of water, based on 100 parts by weight total of glass and monomer, wherein the water contains of from 0.05 to 2.0 parts by weight, based on 100 parts by weight total of glass and monomer, of methyl cellulose;
    B. Agitating the suspension by tumbling the suspension mass end-over-end;
    C. Polymerizing the monomer; and
    D. Recovering the resulting glass-concentrate capsules.

11. A process as in claim 10 wherein the glass strands have a length of from about ⅛ to about ¼ inch.

12. A process as in claim 10 wherein the amount of monomer is in the range of from 30 to 80 parts and the amount of water is in the range of from 100 to 600 parts.

* * * * *